Patented Feb. 20, 1934

1,947,595

UNITED STATES PATENT OFFICE 1,947,595

THERMOELECTRIC ELEMENT AND THERMOCOUPLE

Otto Hermann, St. Louis, Mo., assignor to Thermo Electric Company, St. Louis, Mo., a corporation of Missouri No Drawing. Application November 21, 1932
Serial No. 643,737

4 Claims. (Cl. 136—5)

My invention relates to thermocouples, particularly to a thermoelectric member therefor consisting of an alloy containing three metallic elements. The principal object of the invention is a thermocouple adapted to produce a larger quantity of electrical energy for a given quantity of heat absorbed at the hot junction of the thermocouple than has been produced by prior thermocouples. Other objects are a thermocouple which will resist oxidation at comparatively high temperatures and a thermoelectric member especially adapted for use as the negative member of a thermocouple.

My invention consists principally in a thermoelectric member composed of an alloy of antimony, zinc and beryllium. The invention further consists in the thermoelectric member and thermocouple hereinafter described and claimed.

One thermoelectric member of the thermocouple embodying my invention is an alloy composed of antimony, zinc and beryllium. The other thermoelectric member of the thermocouple is an alloy composed of copper and nickel. The current in said thermocouple flows from the copper and nickel alloy member over the hot junction to the antimony, zinc and beryllium alloy member. Accordingly, the copper and nickel alloy member constitutes the positive member of the thermocouple and the antimony, zinc and beryllium alloy member constitutes the negative member.

I have found that maximum power output and maximum efficiency of the thermocouple embodying my invention are obtained when the positive member is composed of 55% copper and 45% nickel and the negative member is composed of from 61 to 64% antimony, 35 to 37% zinc and 0.5 to 2% beryllium. The average electromotive force of the thermocouple for 1° C. difference of temperature approaches a maximum value of .000282 volts when the negative alloy member is composed of 63.1% antimony, 35.9% zinc, and 1% beryllium by weight.

A beryllium content in the negative alloy member exceeding 1% decreases its ohmic resistance. Therefore, the flow of current in the thermocouple increases when the beryllium content in the alloy is more than 1% and up to 2%. However, I have found that the power output and the efficiency of the thermocouple are not any greater when the beryllium content in the negative alloy member is from 1% and up to about 2%. In this case, as the beryllium content is increased up to 2%, the electromotive force of the thermocouple decreases in the same proportion substantially as the flow of current increases; and when the negative alloy member is composed of 62.2% antimony, 34.8% zinc, and 3% beryllium, the power output and efficiency of the thermocouple are comparatively small as the drop in the voltage of the thermocouple is greater than the rise in the current flow thereof.

The specific resistance with reference to centimeter cube of any negative alloy when it is composed of 63.1% antimony, 35.9% zinc, and 1% beryllium is only about .0025 ohm. In contrast therewith, the specific resistance of a pure antimony-zinc composition consisting of substantially 63.7% antimony and 36.3% zinc is as high as .0036 ohm. Moreover, a thermocouple formed of a pure antimony-zinc alloy of such proportions as the negative member and a 55% copper and 45% nickel alloy as the positive member produces also a lower average electromotive force per 1° C. difference in temperature than an alloy composed of 63.1% antimony, 35.9% zinc, and 1% beryllium.

The addition of beryllium to the antimony and zinc raises the melting point of the alloy considerably; it is capable of resisting oxidation effectively at elevated temperatures up to 390° C. or higher. Moreover, the alloy is readily workable and is strong enough in cast form for use in thermocouples. This property of the alloy is extremely important when it is noted that a pure antimony-zinc alloy is so brittle that it can not be properly handled and the application thereof in thermocouples is, therefore, impracticable.

To produce the negative alloy metal, I prefer to add the beryllium to the melted antimony after it has acquired a temperature in excess of its melting point. Then, after the beryllium metal is dissolved in the melted antimony, the zinc is added to the antimony-beryllium mixture which readily alloys with it.

What I claim is:

1. A negative thermoelectric element consisting of 61 to 64% antimony, 35 to 37% zinc, and 0.5 to 2% beryllium.

2. A negative thermoelectric element composed of 63.1% antimony, 35.9% zinc, and 1% beryllium.

3. A thermocouple, the positive element of which consists of an alloy of 55% copper and 45% nickel and the negative element of an alloy of 62 to 64% antimony, 35 to 37% zinc, and 0.5 to 2% beryllium.

4. A thermocouple, the positive element of which consists of an alloy of 55% copper and 45% nickel and the negative element of an alloy of 63.1% antimony, 35.9% zinc, and 1% beryllium.

OTTO HERMANN.